(12) United States Patent
Garnier et al.

(10) Patent No.: US 11,054,361 B2
(45) Date of Patent: Jul. 6, 2021

(54) CHARACTERIZATION AND REPRODUCTION OF AN EXPERT JUDGEMENT FOR A BINARY CLASSIFICATION

(71) Applicant: Commissariat A L'Energie Atomique et Aux Energies Alternatives, Paris (FR)

(72) Inventors: Josselin Garnier, Paris (FR); Françoise Poggi, Versailles (FR); Gilles Defaux, Ballancourt sur Essonne (FR); Antonio Cosma, Verrieres le Buisson (FR); Robert Quach, Montreuil (FR)

(73) Assignee: COMMISSARIAT A L'ENERGIE ATOMIQUE ET AUX ENERGIES ALTERNATIVES, Paris (FR)

( * ) Notice: Subject to any disclaimer, the term of this patent is extended or adjusted under 35 U.S.C. 154(b) by 905 days.

(21) Appl. No.: 15/533,881

(22) PCT Filed: Dec. 11, 2015

(86) PCT No.: PCT/FR2015/053452
§ 371 (c)(1),
(2) Date: Jun. 7, 2017

(87) PCT Pub. No.: WO2016/092234
PCT Pub. Date: Jun. 16, 2016

(65) Prior Publication Data
US 2017/0307508 A1    Oct. 26, 2017

(30) Foreign Application Priority Data
Dec. 12, 2014  (FR) .................................. 1462315

(51) Int. Cl.
*G01N 15/14* (2006.01)
*G01N 21/64* (2006.01)
*G01N 15/10* (2006.01)

(52) U.S. Cl.
CPC ..... *G01N 15/1459* (2013.01); *G01N 21/6428* (2013.01); *G01N 2015/1006* (2013.01);
(Continued)

(58) Field of Classification Search
CPC .................. A61K 38/19; A61K 35/17; A61K 2039/5158; C12Q 2600/156;
(Continued)

(56) References Cited

U.S. PATENT DOCUMENTS

| 8,762,068 B2* | 6/2014 | Tammero ............... G16B 25/00 |
| | | 702/19 |
| 2003/0143641 A1* | 7/2003 | Brice ................... G01N 33/567 |
| | | 435/7.21 |

(Continued)

OTHER PUBLICATIONS

Balantic, et al. 2020 Statistical learning mitigation of false positives from template detected data in automated acoustic wildlife monitoring. Bioacoustics vol. 29 No. 3 296-321.*

(Continued)

*Primary Examiner* — Mary K Zeman
(74) *Attorney, Agent, or Firm* — Brinks Gilson & Lione

(57) ABSTRACT

A method for analyzing sample cells reacting with at least one specific marker, includes providing a reference sample and an active sample and providing a set ($E^+$) of cells declared positive from among the active sample cells. The method further includes determining a vector coefficient ($\theta$) from the active sample and from the set ($E^+$) and determining at least one set of positive cells in the reference sample as a function of the vector coefficient ($\theta$). A rate of false (Continued)

positives (α) is calculated in the reference sample from the number of positive cells of the reference sample.

5 Claims, 2 Drawing Sheets

(52) U.S. Cl.
CPC ............... *G01N 2015/1402* (2013.01); *G01N 2015/1488* (2013.01); *G01N 2021/6439* (2013.01)

(58) Field of Classification Search
CPC ............ C12Q 2600/158; C12Q 1/6816; C12Q 1/6881; C12Q 1/6883; C12Q 2537/165; C12Q 2563/107; C12Q 1/6827; C12Q 2545/114; G01N 33/6863; G01N 33/4915; G01N 33/56972; G01N 33/57484; G01N 33/505; G01N 33/5094; G01N 33/68; G01N 33/6845; G01N 33/6854; G01N 33/6869; G01N 15/1459; G01N 2021/6441; G01N 21/64; G01N 33/5044; G01N 33/5047; G01N 2015/1006; G01N 2015/1402; G01N 2015/1488; G01N 2021/6439; G01N 21/6428; G01N 15/1429; G01N 15/1436; G01N 2015/149; G01N 2201/0484; G01N 33/53; G16B 25/10; G16B 40/00; G16B 40/20; G16B 30/00; G16B 20/00; G16B 15/30; G16B 20/10; G16B 20/30; G16B 40/10; G16B 5/00; G16B 25/00; G16B 20/20; G16B 30/10; G16B 35/10; G16B 30/20; G16B 45/00; G16B 5/30; C40B 30/06; C40B 30/04; C40B 50/06; C40B 70/00; C40B 50/04; C07K 14/4748; C07K 16/24; C12N 5/0636; C12N 2310/3513; C12N 2502/11; C12N 5/0638; G06F 19/34; G06F 30/27; G06K 9/00147; G06K 9/6256; G06T 2207/30072; G16H 50/20; G16H 50/30; G16H 10/20; G16H 10/40; G16H 10/60; G16H 50/70; G16H 70/20
See application file for complete search history.

(56) References Cited

U.S. PATENT DOCUMENTS

| | | |
|---|---|---|
| 2009/0063095 A1* | 3/2009 | Bagwell ............ G06K 9/00496 702/181 |
| 2011/0021368 A1 | 1/2011 | Tammero et al. |
| 2014/0195165 A1* | 7/2014 | Kim ..................... G16B 5/00 702/19 |
| 2014/0357505 A1 | 12/2014 | Mohler, III et al. |
| 2019/0018927 A1* | 1/2019 | Knobel ................. G06F 16/287 |
| 2020/0152289 A1* | 5/2020 | Cleary .................. G16B 50/50 |

OTHER PUBLICATIONS

Lin et al. 2015 COMPASS identifies T-cell subsets correlated with clinical outcomes. Nature Biotechnology. vol. 33 No. 6 p. 610-619.*

Richards et al. 2014 Setting objective thresholds for rare event detection in flow cytometry. Journal of immunological methods vol. 409 pp. 54-61.*

Drakesmith et al. 2015 Overcoming the effects of false positives and threshold bias in graph theoretical analyses of neuroimaging data. NeuroImage vol. 118 pp. 313-333.*

Teachey, D.T. et al., "Unmasking Evans Syndrome: T-cell Phenotype and Apoptotic Response Reveal Autoimmune Lymphoproliferative Syndrome (ALPS)", Blood, vol. 105, No. 6, Mar. 15, 2005, pp. 2443-2448.

McDonald, Keely G. et al., "CC Chemokine Receptor 6 Expression by B Lymphocytes Is Essential for the Development of Isolated Lymphoid Follicles", The American Journal of Pathology, vol. 170, No. 4, Apr. 1, 2007, pp. 1229-1240.

International Search Report of WIPO Publication No. 2016/092234 dated Jun. 16, 2016, 3 pages.

* cited by examiner

CHARACTERIZATION AND REPRODUCTION OF AN EXPERT JUDGEMENT FOR A BINARY CLASSIFICATION

TECHNICAL FIELD

The present application relates to the field of analysis by flow cytometry, and more particularly an automated analysis method for evaluating the quantity and the type of cells corresponding to a specific marker or markers. Advantageously, this method is designed for Intracellular Cytokine Staining (ICS) assays.

BACKGROUND

This type of assay is usually carried out on blood samples incubated with antigens ($\alpha y$) derived from viruses, bacteria or cancerous cells. After this incubation, the cells (Ce) capable of recognizing the antigens ($\alpha y$), start to produce different molecules (Mo) (usually cytokines) which are detected using an antibody ($\alpha C$). Each antibody ($\alpha C$) is specific to a given molecule (Mo) and is coupled to a given fluorescent probe (fP). This mechanism is shown diagrammatically in FIG. 1. Thus, the analysis of the fluorescence associated with a cell makes it possible to identify which molecules have been produced by this cell. A fluid stream and a laser beam are the main components of a flow cytometer, an instrument capable of reading the fluorescence associated with each cell. Nowadays, flow cytometers can detect up to eighteen fluorescent probes per cell.

An antibody coupled to a fluorescent probe thus forms a marker, denoted (Mj), for a molecule corresponding to a given antigen.

In ICS a cell (Ce) is declared positive if it has produced in a "detectable" quantity, i.e. in a quantity greater than a predetermined threshold, at least one molecule (Mo) of interest. The methods currently used for identifying the cells that are "positive", therefore reacting with at least one of the markers, rely on the visual judgement of an expert. The data set of a sample to be analysed can in fact be represented in the form of a scatter diagram, in a multidimensional space, of dimension given by the number of markers. Each point corresponds to a cell and is composed of the expressions of all the markers for this cell. As illustrated in FIG. 2, the user, i.e. generally the expert, visualizes two-dimensional sections of one of the markers (Mj) with respect to another (Mj') in this multidimensional space and refers to a sample called "reference" (i.e. a sample of known negatives), before incubation, in which all the cells are negative. The expert then manually draws the selection intervals around which he judges there to be positive cells, i.e. which are distinguished visually from the scatter diagram along one or other of the 2 axes, and therefore one or other of the 2 markers represented. This is for example represented by the dotted outline in FIG. 2.

A drawback of this procedure is that it is subjective and makes the results from different users or laboratories difficult to compare. Moreover, such a procedure is difficult to reproduce.

SUMMARY

In order to at least partially resolve the aforementioned drawbacks, a subject of the present application is to propose an automated analysis method which makes it possible in particular to make the analyses of the fluorescence responses obtained by flow cytometry robust and reproducible.

To this end, according to a first aspect, a method is proposed for analysing the cells of a sample reacting with at least one specific marker, in particular with at least two specific markers, or even generally with d specific markers with $d \geq 2$ and even $d > 2$, for example $d \geq 10$, even $d \geq 20$, even $d \geq 50$, comprising:

- a step of providing a reference sample and a sample to be analysed;
- a step of providing a set ($E^+$) of cells declared positive by an expert from among the cells of the sample to be analysed;
- a step of determining a vector coefficient ($\theta$) from the sample to be analysed and from the set ($E^+$);
- a step of determining at least one set of positive cells in the reference sample as a function of the vector coefficient ($\theta$); and
- a step of calculating a rate of false positives in the reference sample ($\alpha$) from the number of positive cells of the reference sample.

According to a second aspect, a method is also proposed for analysing cells of a sample reacting with at least one specific marker, in particular with at least two specific markers, even generally with d specific markers with $d \geq 2$ and even $d > 2$, for example $d \geq 10$, even $d \geq 20$, even $d \geq 50$, comprising:

A step of providing a reference sample and a sample to be analysed;
A step of providing a rate of false positives ($\alpha$) in the reference sample;
a step of determining a vector coefficient ($\theta$) from the reference sample and from the rate of false positives ($\alpha$); and
a step of determining at least one set ($S^+$) of positive cells in the sample to be analysed as a function of the vector coefficient ($\theta$).

Here, a positive cell is therefore a cell considered as having reacted with at least one of the markers.

Such a method thus makes it possible:

On the one hand, to express in terms of an "error rate" the visual classification at which an expert arrives by analysing a sample (potentially comprising positive cells) with respect to a reference sample (only comprising negative cells); this error rate is the rate of false positive cells detected, false if the reference sample is to be believed. The "eye" of each expert can thus be characterized by an "error rate" which is specific to him and compare the judgements of different experts on the same sample, i.e. the rate of "false positive cells" that they allow themselves to accept in the classification process.

On the other hand, to systematically use one and the same judgement, i.e. one and the same error rate, for classifying samples of different origins. Adapted to ICS, this method makes it possible to automatically analyse the immune response of cells placed in contact with viruses, bacteria and/or cancerous cells.

In other words, in order to compare different analyses, based on classifications produced by different users, it is possible to determine a variable representative of the classification, the rate ($\alpha$).

The correlation between the rate ($\alpha$) and the classification of the positive cells of the sample to be analysed is moreover virtually bijective, i.e. by imposing the rate ($\alpha$) determined from sorting carried out by a user, and thanks to the optimization procedure of the present invention, it is possible to find a set of positive cells ($S^+$) very strongly corresponding with the initial sorting of the user. In other words, the method according to the invention makes it possible to find a unique solution.

In other words, in a particularly useful example of implementation, the rate of false positives α used in the method according to the second aspect is the rate of false positives a determined at the end of the method according to the first aspect.

Thus, the method according to the first aspect therefore comprises:
- a step of providing the rate of false positives (α) in the reference sample;
- a step of determining a vector coefficient (θ) based on the reference sample and on the rate of false positives (α); and
- a step of determining at least one set ($S^+$) of positive cells in the sample to be analysed as a function of the vector coefficient (θ).

It is important to note that the two approaches are parallel.

In the first case, the method uses at the input, a reference sample i.e. known negative cells, a sample to be analysed, as well as a sub-set of cells of a sample to be analysed judged positive by a user (i.e. a set called $E^+$), also called expert. The method then comprises a step of determining a threshold (or generally a value of interest), for each of the markers, above which a cell is considered positive for the marker considered. These thresholds are determined in order to reproduce as well as possible the expert judgement on the sample to be analysed. At the output, the method returns an analysed rate of false positives in the reference sample and a classification of the sample to be analysed, i.e. a set of positive cells ($S^+$) and a set of negative cells ($S^-$). A cell is determined positive if its expression for at least one marker is greater than the threshold adopted for this marker.

In the second case, the method uses at the input, the reference sample, the sample to be analysed as well as a tolerable rate of false positives α. The method then comprises a step of determining, for each of the markers, the threshold above which a cell is considered positive with respect to this marker. These thresholds are determined in order to maximize the number of positives detected in the sample to be analysed, subject to reproducing the rate of false positives imposed in the reference sample. At the output, the method returns a classification of the analysed sample i.e. a set of positive cells ($S^+$) and a set of negative cells ($S^-$).

In both cases, it is a question of determining, based on one of the samples of cells (either the sample to be analysed or the reference sample) and with one of the additional parameters (either set ($E^+$) of cells declared positive by an expert from among the cells of a sample to be analysed or the rate of false positives (α) in the reference sample), a vector coefficient (θ), then applying the vector coefficient to the other of the samples of cells (either the reference sample if it is a question of considering the sample to be analysed or the sample to be analysed if it is a question of considering the reference sample). In the first case, it is thus possible to determine the rate (α) whereas in the second case the method returns to at least the set ($S^+$) of cells considered as positives from among the cells of a sample to be analysed.

A "vector coefficient" therefore refers here to a vector comprising a set of coefficients relating to each of the markers.

In both cases, the method thus leads to a classification into a set of positive cells and a set of negative cells of the cells of the other sample as a function of the vector coefficient (θ). As will be detailed below with reference to the figures, in a particularly useful embodiment, either the method therefore makes it possible to determine a from the set $S^+$, which in the first case is best superimposed on the set $E^+$, or the method makes it possible to determine the set $S^+$ from the rate α when it is imposed as input.

Of course, using the sample to be analysed and the reference sample means that the user (in order to produce his own classification or to implement the method) here uses expressions of each of the cells of each of the samples with each of the markers. Prior measurements of a value of interest (here the expressions of each of the markers) are therefore produced.

Such a method thus aims to better ensure the reproducibility of the detection method and is robust, i.e. adaptable to the variability inherent in biological assays. Moreover, it makes it possible to compare the results of different scientists on different samples if these adopt a common "error rate" value, or relativize the conclusions of a scientist on a particular sample if its rate of false positives exceeds the values allowed by the expert community.

In both cases, the method thus comprises, for example, a step of identifying a mathematical model and a step of determining a vector coefficient, called here θ, from a reference sample and/or a sample to be analysed according to the version implemented.

According to a useful example, the vector coefficient (θ) is the vector of the threshold values for the expression of each of the markers, i.e. a set of threshold values for the expression of each of the markers, above each of which a cell is declared positive. This determination of the vector coefficient θ can be carried out by an optimization method:
- for reproducing a classification made by a user (first case),
- or for maximizing the number of positive cells detected in a sample to be analysed, subject to respecting a rate of false positives given in a reference sample (second case).

In other words, the step of determining the vector coefficient (θ) comprises, for example, minimizing a quantity of false positives and minimizing a quantity of false negatives in the sample to be analysed.

Or for example, the step of determining the vector coefficient (θ) comprises a maximization of a quantity of positive cells in the sample to be analysed respecting the given rate of false positives (α).

According to a useful example of implementation, the step of determining the vector coefficient (θ) comprises:
- a step of defining, for each of the markers j, an $s_j$-quantile $y_j^s$, quantile of a cumulative distribution function $P_j^{test}$ associated with a smoothed probability distribution function $p_j^{test}$ determined by smoothing a marginal distribution of the $j^{th}$ marker in the sample to be analysed;
- a step of defining the set ($S^+$) of cells declared positive with respect to the $s_j$-quantile $y_j^s$ for each marker j in the sample to be analysed;
- a step of defining and determining a cardinal of the symmetrical difference between $S^+$ and $E^+$;
- a step of determining each of the largest values of the vector coefficient (θ) of each of the markers by minimizing the cardinal with respect to the value $s_j$ of each marker j in the interval [0,1], for all the markers.

According to another useful example of implementation, the step of determining a vector coefficient (θ) comprises:
- a step of defining, for each of the markers j, an $s_j$-quantile $y_j^s$, quantile of a cumulative distribution function $P_j^{ref}$ associated with a smoothed probability distribution function $p_j^{ref}$ determined by smoothing a marginal distribution of the $j^{th}$ marker in the reference sample;

a step of defining a function F(s) representing a rate of negative cells in the reference sample, increasing from [0,1] to [0,1], by $$F(s) = \frac{card(VN^s)}{n},$$

where $VN^s$ is defined by $VN^s=\{i=1, \ldots, n$ such that $y_{ij}^{ref}<y_j^s$ for each $j=1, \ldots, d\}$, the set of the cells of the reference sample a measured value of which is under the value of the vector coefficient ($\theta$) of the corresponding marker for all the markers;

a step of determining the smallest value of $s_j$ such that $F(s)>1-\alpha$; and a step of determining the values of the vector coefficient ($\theta$).

According to a useful mode of implementation, the method comprises an analysis step in which at least one marker to which at least one cell reacts positively is identified.

If necessary, the method can comprise a step of verification by evaluating a confusion matrix. This makes it possible to verifier a quality of learning. For example, for the reference sample, for a certain value of the vector coefficient $\theta$, considering for example that it comprises the set of the expression threshold values of each of the markers above which a cell is declared positive, the confusion matrix is as follows:

| Actual reference sample | Predicted reference sample | |
|---|---|---|
| | Negative cells | Positive cells |
| Negative cells | $VN_{ref}$ True negatives | $FP_{ref}$ False positives |
| Positive cells | 0 | 0 |

The confusion matrix makes it possible of compare observed values with those that are predicted by the mathematical model. In fact, a perfect model applied to the reference sample should only return true negatives. Such a matrix reflects the fact that, although a reference sample is only supposed to comprise, by definition, negative cells, the mathematical model will indicate that this sample comprises negative cells and positive cells. The cells identified as negatives by the model are therefore considered as true negatives, while the cells identified as positives by the model are considered as being false positives, since by definition the reference sample comprises none. This thus makes it possible to define a rate of false positives in the reference sample:

$$\alpha = \frac{FP_{ref}}{FP_{ref} + VN_{ref}}$$

where $FP_{ref}$ represents the number of false positives and $VN_{ref}$ the number of true negatives, both in the reference sample.

In a perfect model, this rate $\alpha$ would therefore be zero. But the learning rules used in the two embodiments lead to this result being impaired, i.e. to allow a value of $\alpha$ different to zero, for example comprised in the interval [0; 0.5].

In the first case, the judgement of a user for the sample to be analysed is known, i.e. the set of the positive cells ($E^+$) and the set of the negative cells determined by a user on the sample to be analysed. The method then determines the vector coefficient $\theta$ allowing the best classification of this user to be found. The confusion matrix for the sample to be analysed is as follows:

| Actual sample to be analysed | Predicted sample to be analysed | |
|---|---|---|
| | Negative cells | Positive cells |
| Negative cells | TN True negatives | FP False positives |
| Positive cells | FN False negatives | TP True positives |

The step of determining the vector $\theta$ can then consist of minimizing the sum of the values of FP (false positives) and of FN (false negatives) of the sample to be analysed, or the rate of false positives FP/(FP+TN) and of false negatives FN/(FN+TP), which amounts to the same thing as FP+TN=FN+TP.

It appears that this problem of optimization has a single optimum vector $\theta$ (on condition that the sample to be analysed is sufficiently large, a criterion the assessment of which depends both on the number of cells in the sample as well as the information content of the sample considered) and that this optimum can be characterized by the rate of false positives $\alpha$ in the reference sample, i.e. by applying the method with the optimum vector 9 determined previously to a reference sample.

In the second case, a tolerable rate of false positives a is imposed. A confusion matrix for the sample to be analysed cannot then be presented as the classification of the user is not known a priori. Then it is sought to determine the vector coefficient $\theta$ which maximizes the number of positives detected in the sample to be analysed, while respecting the rate of false positives $\alpha$, imposed, in the reference sample provided. This method makes it possible to find the classification that a user would have been able to make visually which produces the same rate of false positives $\alpha$.

In both cases, the method thus makes it possible to analyse the cells of the sample to be analysed, i.e. not only to quantify them, but also to identify which cells have reacted with at least one of the markers.

BRIEF DESCRIPTION OF THE DRAWING

The invention, according to an example of implementation, will be better understood and its advantages will be more apparent on reading the detailed description which follows, given by way of example and in no way limitative, with reference to the attached drawings in which.

DETAILED DESCRIPTION

The present description refers by way of example to Intracellular Cytokine Staining (ICS) assays. Of course, the analysis method described within the scope of the present application is applicable to any type of analysis of cells, or even to any problem of multidimensional classification.

Figure 1:
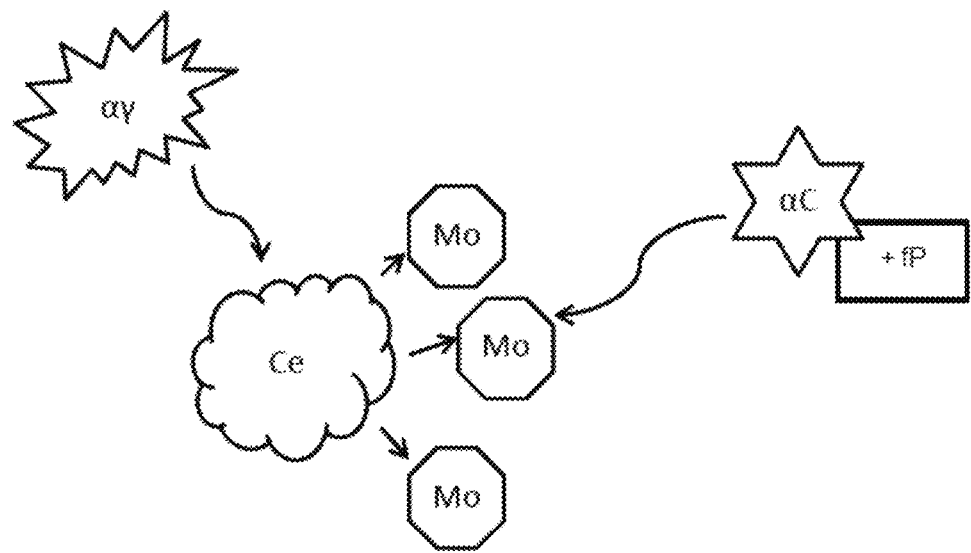
FIG. 1 diagrammatically shows a mechanism for the production of molecules (Mo) by a cell (Ce) excited by an antigen ($\alpha$y), each molecule being detectable using an antibody ($\alpha$C) coupled to a fluorescent probe (fP)

An ICS assay is usually carried out on blood samples incubated with antigens (ay) derived from viruses, bacteria or cancerous cells. As shown in FIG. 1, after this incubation, the cells (Ce) capable of recognizing the antigens (αy) start to produce different molecules (Mo) (usually cytokines) which are detected using antibodies (αC). Each antibody (αC) is specific to a given molecule (Mo) and is coupled to a given fluorescent probe (fP). Thus, the analysis of the fluorescence associated with a cell makes it possible to identify which molecules have been produced by this cell.

In ICS a cell (Ce) is declared positive if it has produced in a "detectable" quantity, i.e. in a quantity greater than a predetermined threshold, at least one molecule (Mo) of interest. The methods currently used for identifying the cells that are "positive", thus reacting with at least one of the markers, rely on the visual judgement of an expert, or user.

The data set of a sample to be analysed can in fact be represented in the form of a scatter diagram, in a multidimensional space, of dimension given by the number of markers. Each point corresponds to a cell and is composed of expressions of all the markers for this cell.

Figure 2:
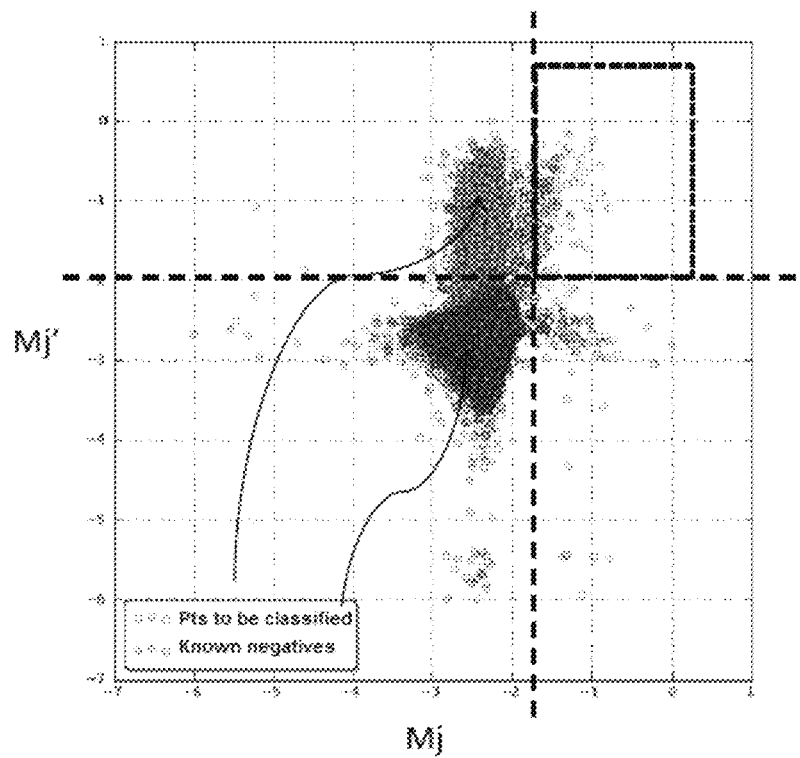
FIG. 2 shows a representation in two dimensions, representing a first marker (Mj) and a second marker (Mj'), of a distribution of the cells of a reference sample and of a sample to be analysed.

As shown in FIG. 2, the user, i.e. generally the expert, visualizes two-dimensional sections of one of the markers (Mj) with respect to another (Mj') in this multidimensional space and refers to a sample called "reference" (i.e. a sample of known negatives), before incubation, in which all the cells are negative.

The expert then manually draws the selection intervals around which he judges there to be positive cells, i.e. which are distinguished visually from the scatter diagram along one or other of the two axes, and therefore one or other of the two markers represented. This is for example represented by the dotted outline in FIG. 2.

A drawback of this procedure is that it is subjective and makes the results from different users or laboratories difficult to compare. Moreover, it is very difficult to reproduce.

In order to at least partially resolve the aforementioned drawbacks, the method, according to an example of implementation of the present invention, analyses two samples, the first being the reference sample of the known negative cells and the second being the sample to be analysed of the unknown cells. It identifies the positive cells in the sample to be analysed. In other words, the input data of the method are constituted by two samples:

The reference sample, which is for example represented by a matrix which contains the measurements (of fluorescence) of a sample of n negative cells (in which no marker is expressed, as the cells have not been affected), "n" thus being the size of the information exploited or the number of points. For each cell, a number d of markers (identified for example as Mj, with j=1 . . . d) are measured, "d" therefore being the dimension of the negative cells.

The reference sample is for example denoted $\underline{X}^{ref}$, a matrix of size n×d, where $\underline{X}^{ref}=[x^{ref}_{ij}]$ (with i=1, . . . , n and j=1, . . . , d), $x^{ref}_{ij}$ corresponding to the measurement (of fluorescence) of the $j^{th}$ marker for the $i^{th}$ cell.

The sample to be analysed, which is for example represented by a matrix which contains the measurements (of fluorescence) of a sample of m cells, which contain positive and negative cells (among which certain markers are expressed; the cells having been affected, certain have reacted). For each cell, the same d markers (fluorescent) are measured.

The sample to be analysed is for example denoted $X^{test}$, a matrix of size m×d, where $\underline{X}^{test}=[x^{test}_{kj}]$ (with k=1, . . . , m and j=1, . . . , d), $x^{test}_{kj}$ corresponding to the measurement (of fluorescence) of the $j^{th}$ marker for the $k^{th}$ cell.

The main output data of the method are the set of cells of the sample to be analysed which are declared as being positive. A cell of the sample to be analysed is declared positive if the normalized expression of one of the markers, i.e. of at least one of the markers, is greater than the corresponding threshold value estimated in the third step, detailed later on.

First Step: Preparation of the Data

During a first step, which is optional, the expressions of the markers (measured fluorescence values) for the reference sample and for the sample to be analysed are for example firstly normalized then expanded. In other words, the step of preparation comprises for example a step of normalization and a step of expansion of the data. This makes it possible to render the measurements independent of the scale and of the calibration of the measurement tool. Such conditioning of the problem makes it possible moreover to simplify the method while making it possible for the classification to be carried out correctly.

It should be noted for example that the previously defined matrices $\underline{X}^{ref}$ and $\underline{X}^{test}$ once normalized by: $\underline{Y}^{ref}=[y^{ref}_{ij}]$ and $\underline{Y}^{test}=[y^{test}_{kj}]$ where $y^{ref}_{ij}$ and $y^{test}_{kj}$ are the normalized values of the expressions of the markers (measurements of fluorescence) $x^{ref}_{ij}$ and $x^{test}_{kj}$. In order to do this, the measurements are referred to the values in the unit interval [0,1] then they are expressed in logarithmic scale.

For example, for each marker j in $\{1, \ldots, d\}$, the step of preparation of the data of the method comprises for example of the following steps:

a step of determining a minimum $x_{\{j,min\}}$ and a maximum $x_{\{j,max\}}$ of the measured expressions of the marker considered in the reference sample and in the sample to be analysed;

a step of normalization and expansion of the data of the reference sample and the sample to be analysed, which is carried out as follows:

$$y^{ref}_{ij}=f_j(x^{ref}_{ij}); \ i=1, \ldots, n; \ j=1, \ldots, d$$

$$y^{test}_{kj}=f_j(x^{test}_{kj}); \ k=1, \ldots, m; \ j=1, \ldots, d$$

where $f_j(x)$ is for example the following expansion function:

$$f_j(x)=\log_{10}((x-x_{\{j,min\}})/(x_{\{j,max\}}-x_{\{j,min\}})+\varepsilon)$$

in which $(x-x_{\{j,min\}})/(x_{\{j,min\}})$ corresponds, strictly speaking, to the normalization and where $\varepsilon$ is the expansion parameter; with j in $\{1 \ldots, d\}$, and $\varepsilon$ comprised between $10^{-3}$ and $10^{-6}$ for example, this number being able to be adapted. It is for example $10^{-6}$.

Second Step: Smoothing of the Distribution of the Values Obtained for a Sample

This step aims to smooth the probability densities of the markers of the sample considered, for example the reference sample for the example detailed here, normalized, so that they become continuous and independent of the effects of discretization. In other words, this makes it possible to have a continuous probability density function based on the discrete values that are the results of measurements. It is for example possible to use the Parzen-Rosenblatt method, also called "kernel estimator".

The unidimensional probability densities (i.e. for one marker at a time) are for example obtained using the kernel estimation method with a Gaussian kernel and the Silverman rule for the width of the kernel, called smoothing parameter. For example, this is applied to the normalized data of the reference sample determined in step 1, i.e. $y^{ref}_{ij}$.

For each marker j in $\{1, \ldots, d\}$ the smoothing step of the method comprises for example the following steps:
 a step of selecting a kernel K, for example Gaussian;
 a step of determining the smoothing parameter h, which corresponds to the width of the smoothing kernel, by using for example the Silverman rule:

$$h_j = \left(\frac{3}{4n}\right)^{\frac{1}{5}} \min(\sigma_j, irq_j)$$

where $\sigma_j$ and $irq_j$ are respectively the empirical standard deviation and the interquartile of the set $\{y^{ref}_{ij}, i=1, \ldots, n\}$.
 a step of defining the density probability function of the marginal distribution function of the $j^{th}$ marker of the reference sample by:

$$p^{ref}_j(x) = \frac{1}{nh_j} \sum_{i=1}^{n} K\left(\frac{x - y^{ref}_{ij}}{h_j}\right)$$

where K is a kernel, for example the Gaussian kernel defined by $$K(x) = \frac{1}{\sqrt{2\pi}} \exp\left(\frac{-x^2}{2}\right).$$

At this stage, the results of normalized measurements for the sample to be analysed and a probability density of the result for each marker for the reference sample are thus known.

Figure 3:
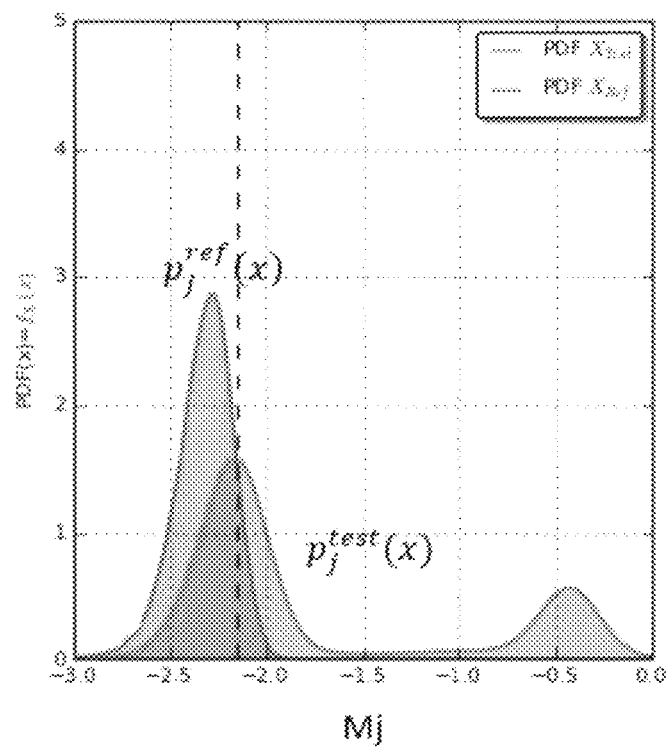
FIG. 3 shows an example of smoothed probability density obtained for a marker (j) as a function of the measurements carried out in a reference sample and in a sample to be analysed.

These probability densities are for example shown in FIG. 3 for a marker j.

Then, the method comprises a step of defining an estimation of the multivariate densities, which correspond to the product of the univariate kernels, for example as follows:

$$p^{ref}(x) = \frac{1}{n \times h_1 \times \ldots \times h_d} \sum_{i=1}^{n} \prod_{j=1}^{d} K_j\left(\frac{x_j - y^{ref}_{ij}}{h_j}\right)$$

It is moreover possible to simplify this expression by considering that $K_j=K$, or even $h_j=h$ for all the dimensions.

According to the version of the method, defined hereafter, which is implemented, the smoothing step is carried out on at least the sample to be analysed instead of the reference sample.

Third Step: Estimation of the Thresholds

The following step, here the third step, aims to determine the values of the thresholds for the expressions of the markers above which a cell is declared positive.

In order to determine the threshold associated with each marker, two cases are envisaged here.

In a first case, called version 1, an auxiliary input comprises a sub-set $E^+$ of cells of the sample to be analysed that the user judges positive. The method then produces an auxiliary output which is the rate $\alpha$ of false positive corresponding to the judgement of the user.

In a second case, called version 2, the auxiliary input is the acceptable rate $\alpha$ of false positives, which corresponds to the proportion of cells which are detected as positive by the method when it is applied to a sample of negative cells, for example the reference sample.

By default, if no auxiliary input is provided, the method carries out version 2 with the imposed value $\alpha=0$, which corresponds to minimizing the values of the thresholds, subject to the algorithm declaring all the cells of the reference sample negative. This is the version of the method called "without bias".

In other words, the method comprises a step of providing an additional parameter which is either the set $E^+$, or the rate of false positives $\alpha$, knowing that if no additional parameter is specified, the step of providing an additional parameter consists of considering $\alpha=0$.

In other words, in both cases, the principles of the calculations are the same. In the first case, these are applied in the sample to be analysed for predicting in the reference sample, while in the second case, it is the reverse.

Third Step—Version 1

In version 1, the user firstly carries out sorting from among the cells of a sample to be analysed. The cells judged positive by the user form the set called $E^+$, comprising between 0 and m cells of the sample to be analysed.

In this version, the thresholds are estimated so as to better to reproduce the judgement of the user on the sample to be analysed.

In other words, the third step according to the version 1 comprises for example the following steps:

For a value $s_j$ (thus corresponding to a probability), a step of defining an $s_j$-quantile $y_j^s$, quantile of the cumulative distribution function $P_j^{test}$ associated with the smoothed probability distribution function $p_j^{test}$ determined in step 2 for each marker j:

$$s_j = \int_{-\infty}^{y_j^s} p_j^{test}(x)dx = P_j^{test}(y_j^s)$$

Figure 4:
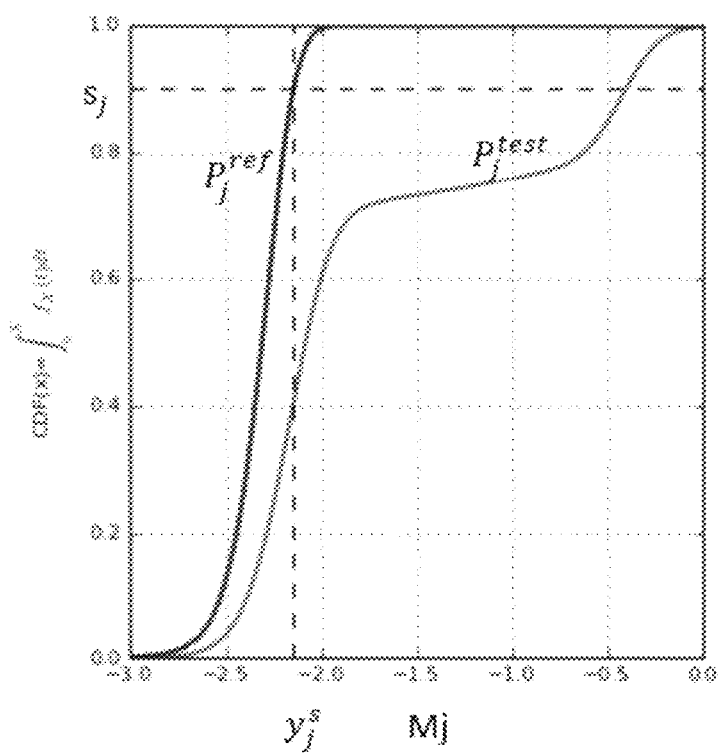
FIG. 4 shows an example of cumulative distribution functions obtained for a marker (j) as a function of the measurements carried out in a reference sample and in a sample to be analysed.

This is for example shown in FIG. 4 for a marker j.

The $s_j$-quantile $y_j^s$ therefore corresponds here to a threshold value of normalized expression for a considered marker j: above, a cell is considered positive for this marker, below it is considered negative for this marker.

a step of defining the set of cells declared positive with respect to the $s_j$-quantile $y_j^s$, for each marker in the sample to be analysed: by taking the combination of these d sets, the set $S^+=\{k=1, \ldots, m$ such that $y_{kj}^{test} \geq y_j^s$ for a $j=1, \ldots, d\}$ is thus obtained. This means that the set $S^+$ comprises the set of the cells of the sample to be analysed considered as positives, i.e. the analysed cells for which the expression of a marker (measured fluorescence value) is greater than $y_j^s$ for at least one given marker. In other words, the set $S^+$ comprises all the cells which have a normalized expression of a marker greater than the threshold for at least one marker.

Therefore at this stage there are two defined sets: $E^+$ the set of cells judged positive by the user, and $S^+$ the set of cells defined positive by the method. If $E^+$ is known, $S^+$ remains to be determined as it depends on the values of the thresholds of each marker, which are to be determined. This determination of $S^+$ is carried out according to the following steps:

A step of defining and determining a cardinal of the symmetrical difference between $S^+$ and $E^+$. This means determining the sum of the number of cells which belong to $E^+$ but not to $S^+$ and the number of cells which belong to $S^+$ but not to $E^+$, i.e. which do not simultaneously belong to both sets $S^+$ and $E^+$.

Then, the method comprises a step of minimizing this cardinal with respect to the value $s_j$ of each marker j in the interval [0,1], for all the markers. This means determining the largest threshold value of each of the markers from among the values minimizing the cardinal. In other words, this step consists of determining a threshold value $y_j^s$ for each of the markers such that a maximum number of cells belong both to $E^+$ and $S^+$. For example, in a "perfect" case $E^+$ and $S^+$ would be superimposed, identical.

The value $s_j$ and the $s_j$-quantile $y_j^s$ for each marker j is thus known.

A simplification comprises for example of considering that all the values $s_j$ are identical, and have for example a value s, and then it is a question of determining the $y_j^s$s corresponding to each of the markers.

Another step comprises for example then defining the function F (increasing from [0,1] to [0,1]) by $$F(s) = \frac{\text{card}(VN^s)}{n},$$

where $VN^s$ is defined by $VN^s=\{i=1, \ldots, n \text{ such that } y_{ij}^{ref}<y_j^s \text{ for each } j=1, \ldots, d\}$, i.e. the set of the cells of the reference sample for which the normalized expression of the marker is under the threshold of the marker corresponding to all the markers (i.e. all the cells of the reference set in an ideal case). Determining the cardinal of this set makes it possible to count these cells which are declared negative. Dividing this cardinal by n then gives the rate of negative cells in the reference sample, n being the total number of cells of the reference sample.

Finally, the method comprises a step of calculating $\alpha$ according to the formula $\alpha=1-F(s)$, the rate of false positives.

In an alternative to defining and determining the function F, it is also possible to determine the confusion matrix, as detailed previously, in order to determine the rate of false positives.

In this version, the rate $\alpha$ is therefore determined based on the set $S^+$ and the method returns to the output, in response, the determined set $S^+$ as well as the rate $\alpha$.

In other words, in this version, the set $S^+$ is constructed from arbitrary, coherent values of $s_j$, then from an optimization procedure so as to find the thresholds $y_j^s$ for each marker which will make it possible to classify the points.

Third Step—Version 2

In version 2, the rate $\alpha$ of false positives that the user judges acceptable is imposed as input value (also called here additional parameter). The rate $\alpha$ corresponds to the rate of cells detected as positives by the algorithm when it is applied to a sample of negative cells, for example the reference sample. As mentioned previously, by default, the algorithm carries out version 2 with $\alpha=0$, which means that the algorithm minimizes the thresholds to ensure that all the cells of the reference sample are declared negative.

The third step for version 2 comprises for example the following steps:

a step of defining $y_j^2$, the $s_j$-quantile of the cumulative distribution function $P_j^{ref}$ associated with the smoothed probability distribution function $p_j^{ref}$ introduced in step 2, for each marker j.

a step of defining the function F (increasing from [0,1] to [0,1]) by $$F(s) = \frac{\text{card}(VN^s)}{n},$$

where $VN^s$ is defined by $VN^s=\{i=1, \ldots, n \text{ such that } y_{ij}^{ref}<y_j^s \text{ for each } j=1, \ldots, d\}$.

A step of determining, by dichotomy for example, the smallest value of $s_j$ such that $F(s)>1-\alpha$.

Knowing the values $s_j$, it is therefore then possible to determine the associated thresholds for each of the markers.

Thus, in this version 2, having fixed an $\alpha$ that is tolerable or equal to 0, the smallest threshold value corresponding to each of the markers is sought.

By applying the determined threshold values to the sample to be analysed, the method can therefore then determine the set $S^+$ of positive cells, as detailed in a fourth step described hereafter.

Thus, in this version, the set $S^+$ is determined from the rate $\alpha$.

Whatever the version (1 or 2), at the end of step 3 described previously, it is known how many cells, and which, are considered positives in the sample to be analysed, and what the rate of false positives ($\alpha$) is in the reference sample and hence, the values $s_j$ and the $s_j$-quantiles $y_j^s$ to be considered for each of the markers.

Fourth Step: Classification of the Sample to be Analysed

Then, a fourth step aims to classify the cells of the sample to be analysed into a set of positive cells on the one hand, and negative cells on the other hand.

A cell of the sample to be analysed is declared positive if the normalized expression of one of the markers, i.e. of at least one of the d markers, is greater than the value of the corresponding threshold estimated in the third step.

The fourth step comprises for example a step of defining and determining a set of cells declared negative in the sample to be analysed by $S^-=\{k=1, \ldots, m \text{ such that } y^{test}_{kj}<y_j^s \text{ for each } j=1, \ldots, d\}$.

The set $S^-$ of the cells declared negative is thus defined, i.e. those of which all the normalized expressions of the markers are under the corresponding thresholds of the markers. The set $S^+$ of cells declared positive is thus the complementary of $S^-$.

Thus, the step mentioned previously is for example particularly useful with reference to version 2 of the third step, whereas in version 1, it is for example possible to determine the set S⁻ directly by taking the complementary of the set S⁺ which has been determined based on the set E⁺ in order to calculate α.

Fifth Step: Analysis of the Positive Cells

For each cell detected as positive in the sample to be analysed, the method can indicate at least one marker the expression of which is greater than the corresponding threshold.

To do this, a first step aims to define a set $X^+$ such that $X^+=\{(k,j), k \text{ in } S^+ \text{ and } j=1, \ldots, d \text{ such that } y^{test}_{kj} \geq y^s_j\}$. Thus, $X^+$ represents the set of the (cell, marker) pairs, where cell is a cell declared positive in the sample to be analysed and marker is a marker the normalized value of which is greater than the corresponding threshold for the cell. As a result, for the set of the cells having been defined as positive, by considering one marker in particular, certain cells have a marker the normalized expression of which is greater than the corresponding threshold, whereas others can have an expression lower than the corresponding threshold, the latter having then been declared positive due to the expression above the threshold of another marker.

Thus, from among the cells declared positive, it is for example possible to count how many times a marker is expressed. In order to do this, a step comprises determining, for each marker j, the value of $Z_j$=card (k in $S^+$ such that (k,j) is in $X^+$), which is also equal to $Z_j$=card (k in $S^+$ such that $y^{test}_{kj} \geq y^s_j$). In other words, the method comprises for example a step of counting the occurrences of a marker.

Knowing the occurrence of each marker for example, it is thus possible to grade them, for example by order of importance, the more important (frequent) being then given by the expression $$\underset{j}{\mathrm{argmax}}(Z_j).$$

The method then comprises for example a step of grading the markers according to their occurrence, i.e. according to the number of times that it is expressed by a cell.

Thus, for example, a postprocessor can then provide a statistical analysis of the output set $X^+$, for example a grading of the markers.

The invention claimed is:

1. An automated analysis method for analysing cells of a blood sample by reacting the cells with at least one specific marker and analyzing fluorescence responses obtained by flow cytometry, the method comprising:

providing a reference sample and an active sample;

providing a rate of false positives (α) in the reference sample characterizing an error rate specific to an expert;

determining a vector coefficient (θ) based on the reference sample and the rate of false positives (α), wherein determining a vector coefficient (θ) comprises:

defining, for each of the markers j, an $s_j$-quantile $y^s_j$, quantile of a cumulative distribution function $P^{ref}_j$ associated with a smoothed probability distribution function $p^{ref}_j$ determined by smoothing a marginal distribution of the $j^{th}$ marker in the reference sample;

defining a function F(s) representing a rate of negative cells in the reference sample, increasing from [0,1] to [0,1], by $$F(s) = \frac{\mathrm{card}(VN^s)}{n},$$

where $VN^s$ is defined by $VN^s=\{i=1,\ldots,n \text{ such that } y^{ref}_{ij}<y^s_j \text{ for each } j=1,\ldots,d\}$, the set of the cells of the reference sample a measured value of which is under the value of the vector coefficient (θ) of the marker corresponding to all the markers;

determining the smallest value of $s_j$ such that $F(s) > 1-α$; and determining the values of the vector coefficient (θ);

determining at least one set ($S^+$) of positive cells in the active sample as a function of the vector coefficient (θ); and outputting a classification of the analyzed active sample as the set of positive cells ($S^+$) and a set of negative cells ($S^-$).

2. The method according to claim 1, wherein determining the vector coefficient (θ) comprises a maximization of a quantity of positive cells in the active sample respecting the given rate of false positives (α).

3. The method according to any claim 1, wherein the vector coefficient (θ) is a set of threshold values of an expression of each of the markers above each of which a cell is declared positive.

4. The method according to claim 1 further comprising an analysis in which at least one marker to which at least one cell reacts positively is identified.

5. The method according to claim 1 further comprising verification by evaluation of a confusion matrix.

* * * * *